Oct. 25, 1960 M. L. CARPENTIER ET AL 2,957,461
OVERHEAD VALVE ENGINE

Original Filed Jan. 4. 1955 5 Sheets-Sheet 1

INVENTORS
MELBOURNE L. CARPENTIER, DECEASED,
BY PAULINE LUOMA, } CO-ADMINISTRATORS,
GERALD KANE
WILLIAM E. DRINKARD

Harness & Harris
ATTORNEYS.

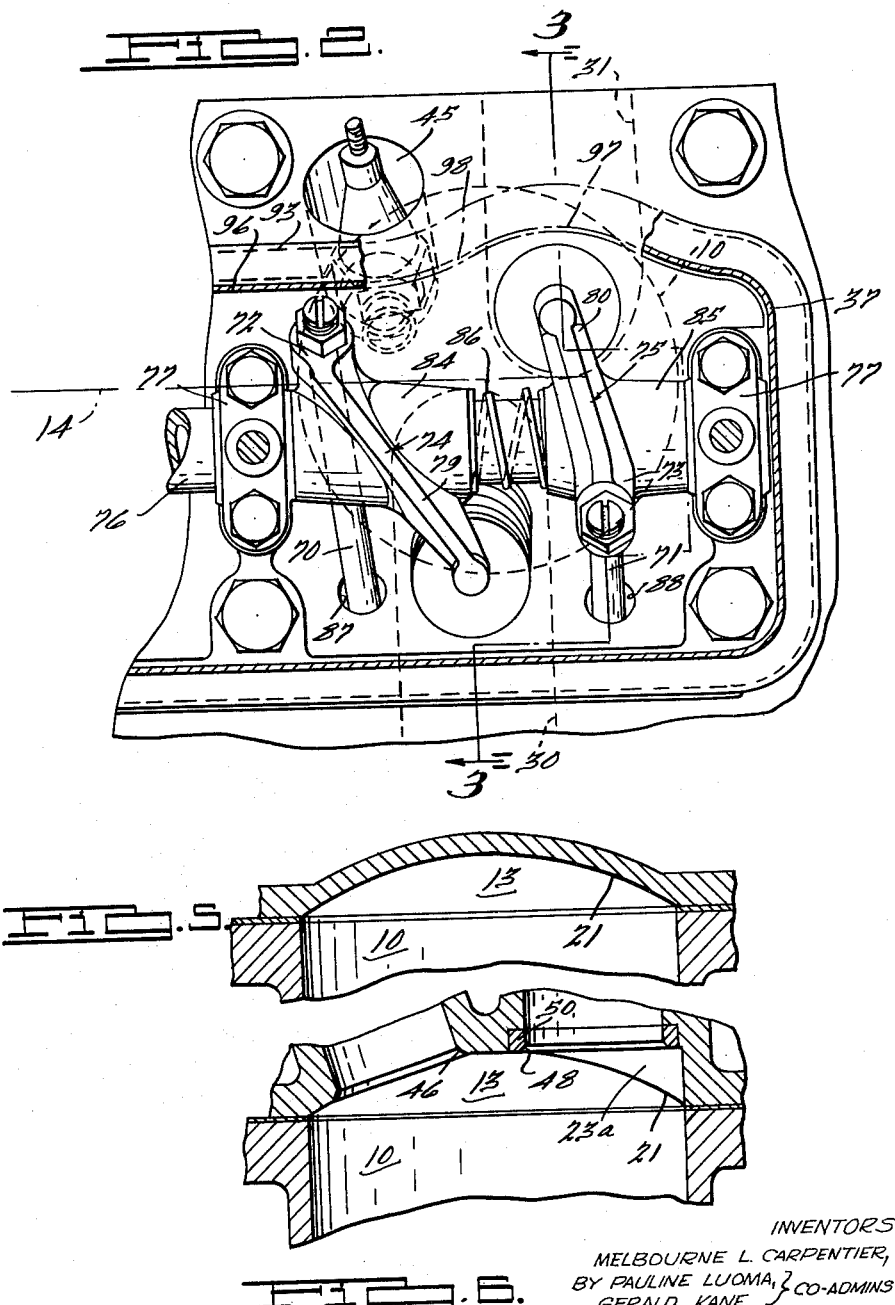

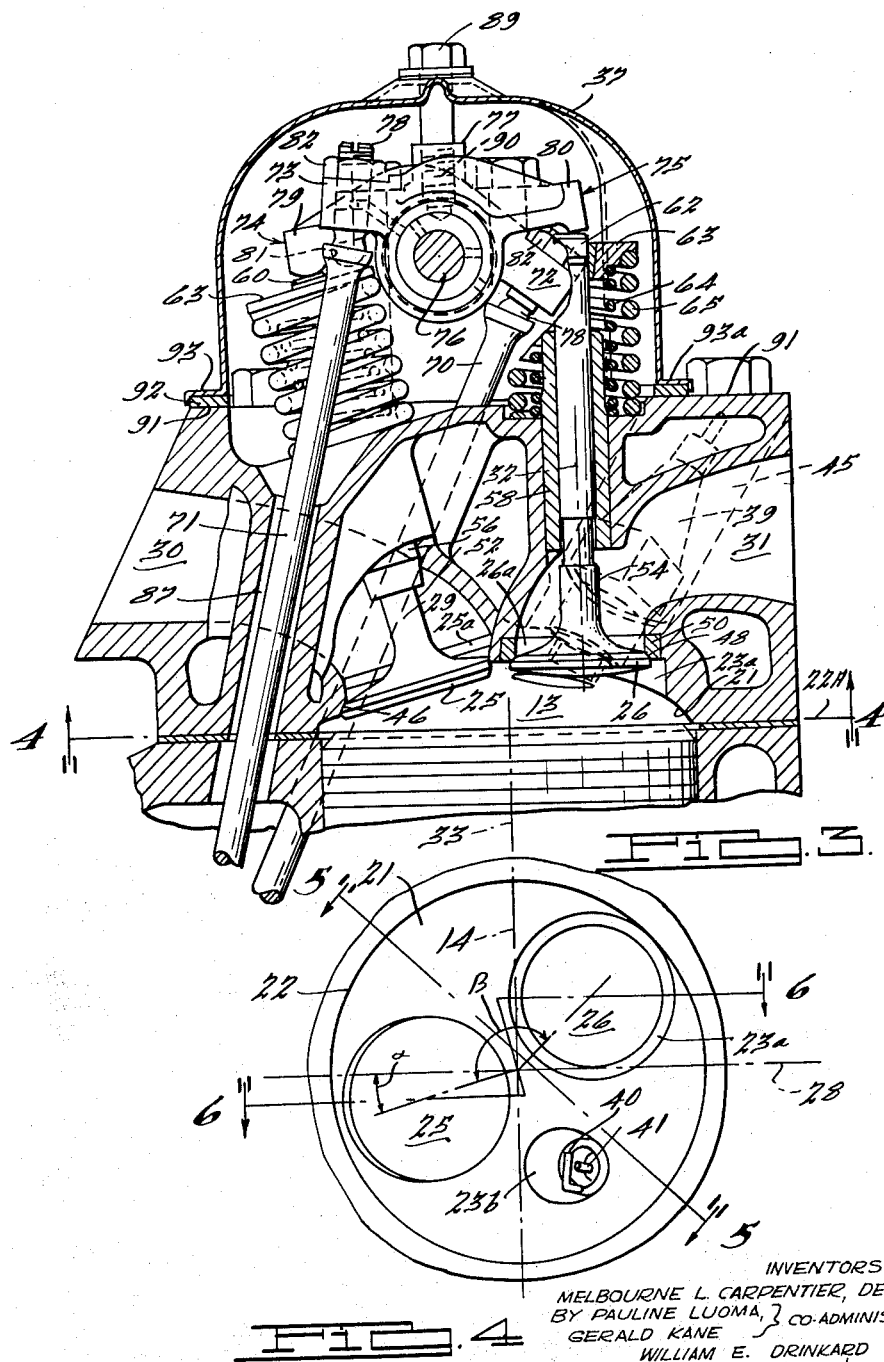

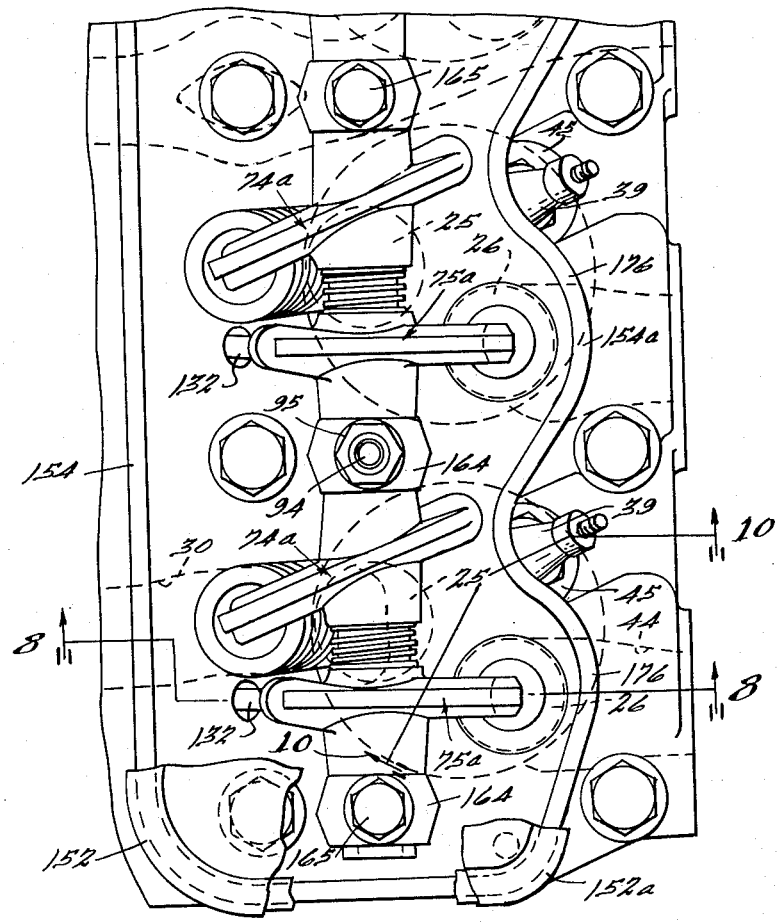

Oct. 25, 1960 M. L. CARPENTIER ET AL 2,957,461
OVERHEAD VALVE ENGINE
Original Filed Jan. 4, 1955 5 Sheets-Sheet 5
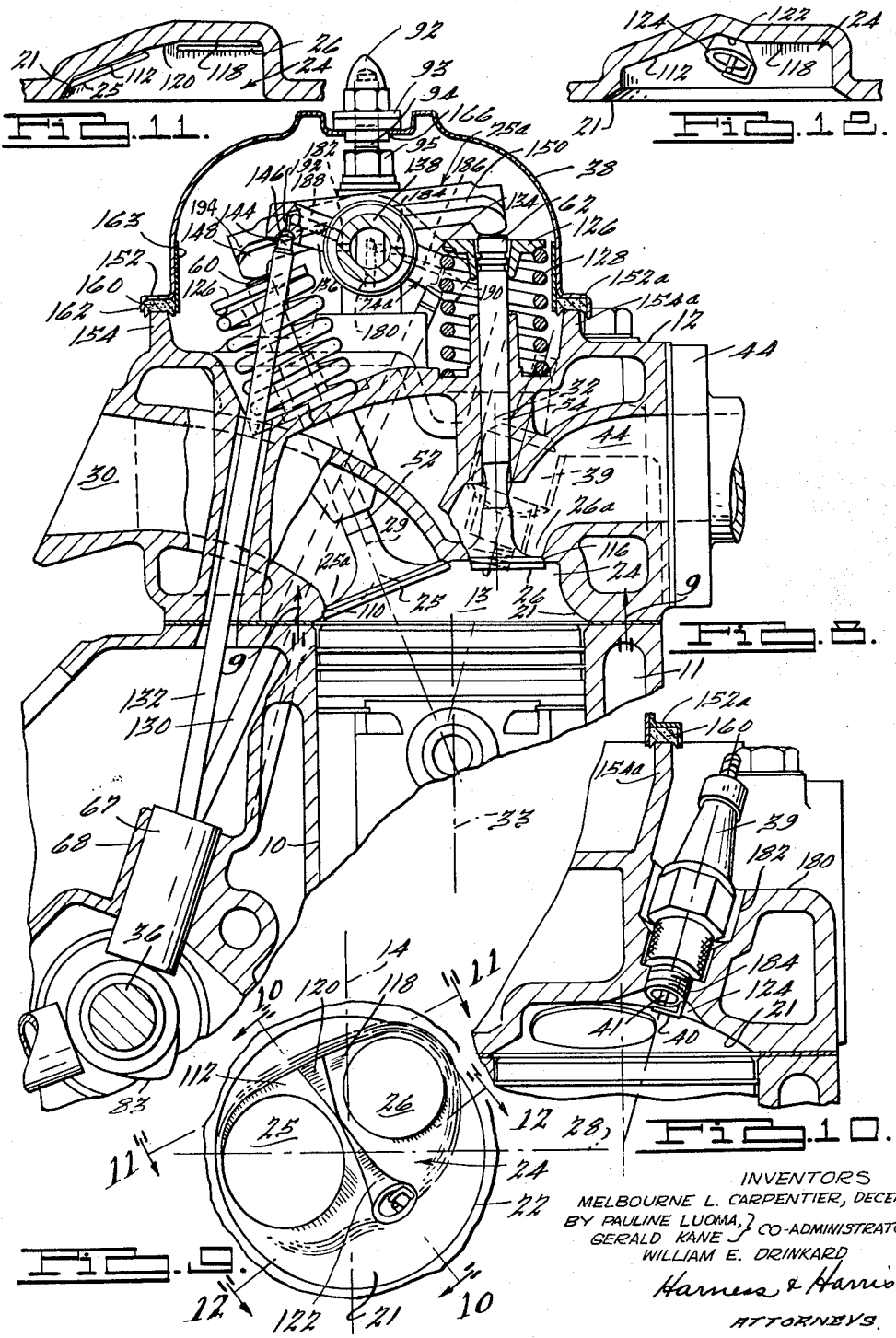
INVENTORS
MELBOURNE L. CARPENTIER, DECEASED,
BY PAULINE LUOMA, CO-ADMINISTRATORS,
GERALD KANE
WILLIAM E. DRINKARD
Harness & Harris
ATTORNEYS.

United States Patent Office 2,957,461
Patented Oct. 25, 1960

2,957,461
OVERHEAD VALVE ENGINE

Melbourne L. Carpentier, deceased, late of Detroit, Mich., by Pauline Luoma, Royal Oak, and Gerald Kane, Grosse Pointe, Mich., coadministrators, and William E. Drinkard, Birmingham, Mich., assignors to Chrysler Corporation, Highland Park, Mich., a corporation of Delaware Original application Jan. 4, 1955, Ser. No. 479,756, now Patent No. 2,833,254, dated May 6, 1958. Divided and this application Oct. 2, 1957, Ser. No. 687,830

11 Claims. (Cl. 123—55)

This invention relates to internal combustion engines of the overhead valve type and particularly to V engines of this character. The subject application is a division of our copending application Serial No. 479,756, filed January 4, 1955, now Patent No. 2,833,254.

More especially our invention relates to improvements in certain aspects of passenger car engines such as disclosed in United States Patent No. 2,669,227, granted February 16, 1954, to William E. Drinkard. This patent shows and claims among other features, constructions which combine in a passenger car engine a hemispherical combustion chamber having a particular arrangement of intake and exhaust valves and firing element, facilitating high power outputs yet avoiding the roughness and complex mechanical arrangements found in aircraft and racing applications where hemispherical combustion chambers have sometimes found application and which arrangement renders the engine practical for passenger car operation. It is the purpose of the present invention, among other things, to retain to the greatest degree the advantages of the Drinkard combination while at the same time attaining a new combination having in addition to other novel features a more compact and lighter weight engine construction.

We have discovered that by providing the valve drive mechanism with a single rocker shaft for the valve operating arms instead of a double rocker shaft arrangement as in Drinkard, and positioning the intake and exhaust valves and sparking element in a particular relationship, a combination having the desired compactness of structure and weight reduction is attainable while at the same time providing a combustion chamber having the high thermal and volumetric efficiency and power characteristics of the hemispherical chamber of Drinkard as well as a more accessible positioning of the firing element and other parts for servicing and for their protection.

It is therefore the principal object of the present invention to provide an engine retaining as much as possible of the features of a pure hemispherical combustion chamber and valve arrangement of the Drinkard engines but providing an engine construction that is more compact and of lighter weight and in which the valve operating mechanism and ignition elements are more readily accessible for servicing.

A further object of this invention is to provide an engine having the features of the preceding object and wherein the inlet and exhaust valves are located and seat in an outward polygonal section or depression in a spherical surface defining the combustion chamber.

Another object of this invention is to provide an engine as in the preceding object having a substantially spherical combustion chamber portion which is modified by a cavity of generally elliptical outline and polygonal character providing surfaces upon which to seat the inlet and exhaust valves.

An additional object is to provide an engine having the features of the preceding objects and in which the firing elements of the combustion chambers are accessible from the exhaust side of the engine and at positions displaced from the valve operating mechanism making each accessible independently of the other.

A specific object is to provide an arrangement as in the preceding object wherein the firing elements are protected from road splash by the exhaust manifolds.

Still another object is to provide an engine as in any of the preceding objects having direct free flowing intake and exhaust ports and passages, large valves widespread to facilitate circulation of cooling water around the ports and eliminate hot spots, a low surface area to volume ratio, a smooth angle of entry for the incoming fuel-air mixture avoiding scrubbing against hot deposits, if any, a short flame travel to avoid detonation, minimum susceptibility to preignition, ability to adjust for a wide range of compression ratios and ability to operate an ordinary low fuel octane.

A more particular object of this invention is to provide an engine as in the preceding objects having a compact valve operating mechanism featuring a single rocker shaft for all the inlet and exhaust valve operating arms of a bank; having combustion chambers of planospherical character possessing the desirable characteristics of pure hemispherical chambers; having a single inlet valve and a single exhaust valve for each cylinder of the engine substantially free of close walls of the valve passages and whose ports in the combustion chamber are on opposite sides of a longitudinal axis through the cylinders of a bank of the engine and staggered lengthwise thereof, and whose passages connecting with the ports are relatively short and transversely directed; and having a sparking element for each cylinder positioned in the cylinder head at the exhaust valve side of the engine and laterally and exteriorly of the valve operating mechanism and inboard of the exhaust manifold so as to be protected thereby and whose firing points are generally directed toward the central region of the combustion chamber at a position intermediate the intake and exhaust valve ports thereof.

Another particular object is the provision of an engine such as in the preceding objects wherein the intake port of each combustion chamber when viewed from the end of the engine, has its axis substantially oblique or inclined to the vertical axis of the cylinder it feeds and to a vertical plane containing this cylinder axis and all others of the same bank and which extended and translated intersects the axis of this cylinder at a point below the center of curvature of the hemispherical surface portion of the combustion chamber; wherein the exhaust valve port has its axis in the intersection of two planes, one a plane paralleling said vertical plane through the cylinder axes and on the opposite side thereof from said intake port and the other a plane normal to said vertical plane, and wherein the intake and exhaust ports are within the combustion chamber and have the widest possible spacing.

A further particular object is to provide an engine as in the preceding objects wherein the axis of each intake valve is angularly inclined with respect to the vertical axis of the cylinder and combustion chamber in which it operates and is contained in a transverse plane normal to a longitudinal plane containing the axes of the cylinders of the same bank containing this cylinder, which transverse plane parallels a second transverse plane through the vertical axis of this cylinder and normal to said longitudinal plane and wherein each exhaust valve axis is substantially parallel to the axis of its cylinder and on opposite sides of the said longitudinal and transverse planes through this cylinder axis from the intake valve axis and is defined by the intersection of vertical planes paralleling said longitudinal and normal planes through the cylinder axis; and wherein the firing element is oriented in a position at an angle to the vertical axis of this cylinder and at an angle to each of said longitudinal and normal planes through the axis of the cylinder.

Another particular object is to provide an engine as in the preceding objects having a valve operating mechanism in which the opposite lever arms of each of the inlet and exhaust valve rocker arms bear a substantially similar numerical ratio to each other and wherein the similarly functioning levers of these arms are of substantially the same length, whereby to facilitate equalization of wear of the camshaft portions actuating the push rods for such rocker arms and to facilitate equalization of spring loads on the inlet and exhaust valves.

A further particular object is to provide an engine as in the preceding objects in which the spark plug for each combustion chamber is disposed in a shallow cavity in the cylinder head adjacent the exhaust side of the engine, exteriorly of the rocker arm mechanism arm cover and inboard of the exhaust manifold so as to make the spark plug readily accessible without special tools and protected from road splash and to make the rocker arm mechanism accessible without disturbing the spark plugs, the spark plug cavity being so directed as to enable positioning of the sparking elements thereof in the central zone of the combustion chamber in which the plug operates.

Further objects and advantages of my invention will be more apparent as this description proceeds, reference being had to the accompanying drawings in which:

Figure 2 is a plan view of a portion of the cylinder head and rocker arm mechanism of one of the engine banks of Figure 1, a portion of the rocker arm cover being cut away to show the rocker arm mechanism;

Figure 3 is a sectional elevational view taken approximately on the line 3—3 of Figure 2 parts being broken away to show the intake valve port and passage in section;

Figure 4 is a plan view looking upwardly into the combustion chamber of the engine structure of Figure 3 in the direction of the arrows 4—4 in that figure and showing the relationship of the valves and sparking element of one of the cylinders of the engine;

Figure 5 is a sectional view taken at 5—5 of Figure 4;

Figure 6 is a sectional view taken at 6—6 of Figure 4;

Figure 7 is a plan view taken similarly to that in Figure 2 and showing a modified form of rocker arm mechanism structure and spark plug cavity, portions of the rocker cover being broken away to expose the rocker mechanism and cover mounting face;

Figure 8 is a sectional elevational view of an engine embodying the mechanism of Figure 7 and showing the valves and valve operating mechanism of Figure 7, this section being taken approximately along the line 8—8 of Figure 7, parts being broken away to show the intake valve port and passage in section;

Figure 9 is a plan view looking upwardly into the combustion chamber of the engine in Figure 8 in the direction of the arrows 9—9 and showing the positioning of the valves and sparking element in relation to the cavity formed in the spherical surface of the combustion chamber;

Figure 10 is a sectional elevational view taken at approximately 10—10 of Figure 7 and 10—10 of Figure 9 showing the manner of mounting the spark plug in the combustion chamber of the engine of Figure 7 in relation to the spherical surface and valves of that chamber;

Figure 11 is a sectional elevation of the combustion chamber of the engine of Figure 8 taken at approximately 11—11 of Figure 9; and Figure 12 is another sectional elevational view of the combustion chamber of the engine of Figure 8 taken approximately at 12—12 of Figure 9.

Figure 1:
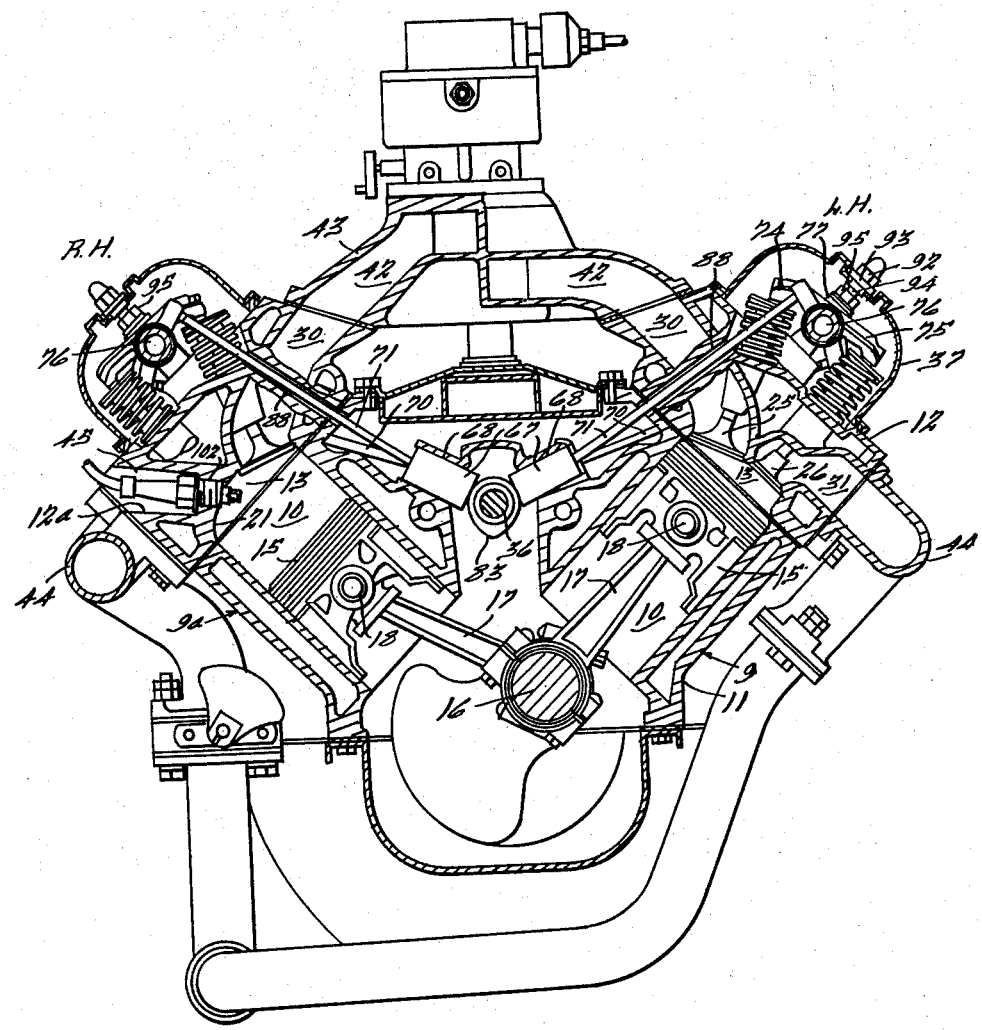
Figure 1 is an end elevational view partly in section of a V engine embodying the novel features of our invention.

For the purpose of illustration but not restriction, our invention will be described relative to two forms of V-8 engines, one of current manufacture, which engines are provided with so-called two-plane 90° crankshafts, modified spherical combustion chambers, and downdraft carburetion of the dual type, the risers of which are preferably arranged to feed a pair of inner cylinders of one bank and a pair of outer or end cylinders of the opposite bank. It will be understood, however, that our invention is also applicable to line engines, to engines of any number of cylinders, and in conjunction with any form of carburetion or fuel injection.

As seen in Figure 1, the V engine there illustrated has two cylinder banks 9 and 9a of cylinders 10, a plurality, for example 4 in each bank arranged at 90° in a cylinder block 11 to which interchangeable cylinder heads 12 and 12a are secured in the customary manner by bolts not shown, and which heads are provided with combustion chambers 13 immediately above each cylinder 10. Although only one cylinder is illustrated in Figure 2, it will be understood that the cylinders of each bank are aligned longitudinally of an axis 14 paralleling the longitudinal axis (not shown) of the engine and that the cylinders of the opposite banks are offset longitudinally relative to each other as is conventional in V engine practice.

Each cylinder 10 is provided with a piston 15 reciprocable therein and operably connected to the crankshaft 16 through a connecting rod 17 and wrist pin 18.

The form of the combustion chamber 13, arrangement of valves and their operating mechanism and of the spark providing element are important features of our invention. Thus we have provided, as seen for example in Figures 1, 3, 4, 5, 6, 8, 9, and 10, a cylinder head combustion cavity 13 of dome-like character directly opposite the upper end of the cylinder bore 10 and defined by a spherical wall or surface 21 which rises from and returns to a generally circular perimeter 22 overlying the cylinder bore 10 and which is in a plane 22A containing the mounting face of the cylinder head. This spherical surface, as evident from the drawings, is interrupted by one or more cavities in the region of the valves and sparking element, Figures 3 and 4, illustrating an arrangement wherein the spherical surface 14 has been machined and is interrupted by machined cavities 23a, 23b, for the exhaust valve and sparking element respectively, and Figures 8 and 9 illustrating an arrangement wherein the chamber 13 is cast and the spherical surface is interrupted by an outward cavity of polygonal configuration generally referred to by the numeral 24 and described in greater detail, formed in the spherical surface 21 in the area of the valves and firing element.

Referring now more particularly to the valve arrangement and its operating mechanism, it will be observed that each combustion chamber 13 is provided with a single inlet valve 25 and a single exhaust valve 26 and that in contrast to the Drinkard patent disclosure aforesaid, where these valves are located on a great circle through the transverse axis 28 of the cylinder and chamber, the valves of the present invention while still generally transversely directed in the sense that they are on opposite sides of the longitudinal axis 14 of the cylinder bank have also been oriented to positions on opposite sides of the transverse axis 28. More specifically, as seen in Figures 4 and 9, the inlet valve 25 is preferably positioned only slightly to one side (below in Figures 4 and 7) of the transverse axis 28 and to the left of the longitudinal axis 14. While the exhaust valve is positioned a substantial distance above the transverse axis 28 and to the right of the longitudinal axis 14, such that the two valves transversely speaking as seen in Figures 4 and 9, are quite close to each other yet the distance between their centers at the ports 25a and 26a respectively, which they close, are substantially that possible in the Drinkard patent arrangement.

This arrangement makes possible the use of large inlet valves and thus facilitates the admission of a maximum quantity of air to the combustion chambers with resultant high thermal efficiency. Moreover, it is still possible for the axis 29 of the intake valve 25 to extend as closely as possible in the direction of flow of the fuel air mixture in the transversely extending inlet passage 30 leading to the intake port 25a to thereby avoid making the fuel air mixture move around sharp or short bends on entering the chamber 13. Moreover, it is still possible to provide short transversely extending exhaust passages 31.

For the purpose of illustration but not limitation, it may be said that in one construction as in Figures 8 and 9 where the cylinder had a 3½" diameter bore, the center of the inlet valve 25 projected to the plane of Figures 4 and 9 was located about ⅞" from the center of the cylinder 10 on a radial line therefrom forming an angle α of about 8° with the transverse axis 28, and the axis of the exhaust valve 26 projected to the same planes was located about 1" from the center of the cylinder on a radial line forming an angle β about 135° with the radial line locating the intake valve. Moreover, as will be further evident from Figures 3, 4, 8, and 9 the valves are not only oriented as described above, but the axis 32 of the exhaust valve is substantially vertical and substantially parallel to the vertical axis 33 of the cylinder and combustion chamber, while the intake valve axis 29 is inclined to the vertical axis 33 of the cylinder. In the case of the engine construction exemplified above having a 3½" bore, the angle between the axes 29 and 33 measured in the plane of Figures 3 and 8, was substantially about 22½° and the axes 29, 33 intersected in the plane of Figure 3 about 1²⁵⁄₃₂" below the mounting face plane 22A.

The aforesaid particular location and positioning of the intake and exhaust valves facilitates operation of the valves from rocker arms having a common axis of oscillation and having relatively short lever arms of similar leverage or ratio while at the same time retaining the novel feature of operation of both valves from a single camshaft 36 located as high as possible above the crankshaft 16 as seen in Figure 1.

The described arrangement moreover facilitates a substantial compacting of the valve operating mechanism making possible narrow and more accessible rocker mechanism covers 37, 38 (Figures 3, 8) and enables positioning of the spark plug 39 at a position at the exhaust side of the engine and removed from the valve mechanism where it is accessible without the use of special tools, and such is possible without sacrificing the advantageous location of the sparking elements 40, 41 of the plug 38 intermediate the intake and exhaust valves and generally centrally of the combustion chamber as will be evident from Figures 4 and 9 and as hereinafter described.

The inlet valves 25 and their ports 25a are served by transversely extending passages 30 of the cylinder heads which in turn connect with intake passages 42 of the intake manifold 43 (see Figure 1) the passages 42 being fed from the carburetor risers (not shown). Moreover, the exhaust valves 26 and their ports 26a are associated with the transversely extending exhaust passages 31 in the cylinder heads and connect with the exhaust manifold 44 which protects the spark plug wells 45 from road splash.

Referring now to Figures 1, 2, 3, 4, 5, and 6, it will be evident that in the embodiment in these figures the intake valve 25 closing the port 25a operates directly against a seat 46 formed in the spherical surface 21 of the combustion chamber 13, while the exhaust valve 26 enclosing the port 26a operates against a seat 48 provided on a hardened heat-resistant ring insert 50 mounted in a shouldered recess or cavity 23a machined in the spherical surface 21.

Moreover, the stems 52, 54 of the intake and exhaust valves respectively are slidably journalled in bushings 56, 58 respectively mounted in the cylinder heads 12 and 12a. Fixed to the upper ends 60, 62 of the valve stems are split collars 63 beneath which are double concentric compression springs 64, 65 serving to normally maintain these valves in closed position.

The valves 25, 26 of the Figure 3 arrangement are operated as seen in Figures 1, 2, and 3 by the camshaft 36 through suitable tappet and push rod mechanism. Thus conventional tappets 67 may be associated with the camshaft 36 and are slidably journalled in lateral bearing portions 68 integral with the cylinder block 11. These tappets are operably connected through suitable push rods 70, 71 with the relatively short lever portions 72, 73 respectively of the inlet valve and exhaust valve rocker arms generally referred to by the numerals 74, 75 respectively, which arms are journalled on a common stationary rocker shaft 76 carried in bearing blocks or brackets 77 bolted to the top side of the cylinder heads 12 and 12a. By thus separately attaching the rocker shaft to the cylinder head the entire rocker assembly can be removed for inspection or repair without loosening the cylinder head from the block.

It will be noted that the push rods 70, 71 respectively communicate with adjustable ball-headed pins 78 secured to the short lever portions 72, 73 of the rocker arms 74, 75 respectively, while the long lever portions 79, 80 of these rocker arms communicate with the shank ends 60, 62 respectively, of the valves. The pins 78 operate in spherical recesses 81 in the ends of the push rods and are retained in their adjusted position on the rocker arms by locking nuts 82.

By reason of our novel valve arrangement, it is found possible to make the lever ratio of the short levers 72, 73 to the long levers 79, 80 of the rocker arms 74, 75 of the same numerical value such that there may be substantially equal wear on the cam surfaces 83 of the camshaft 36. Preferably, the corresponding short levers 72, 73 respectively of the inlet and exhaust valve rockers 74, 75 will be of the same length and the same will preferably be true of the long levers 79, 80.

It will be seen from Figure 2 that the bearing blocks 77 straddle each cylinder so as to confine the rockers 74, 75 between them. As seen, the opposite lever portions of each of the rocker arms are offset longitudinally of the engine so as to facilitate connection thereof with the push rods and valve shanks, the amount of offset being considerably greater in the case of the intake rocker arm 74. Each of the inlet and exhaust rocker arms 74, 75 respectively, are provided with hub portions 84, 85 respectively, which rotatably mount them upon the rocker shaft 76 and these arms are held in their longitudinal locations against the bearing blocks 77 by a compression spring 86. As will be evident from Figures 2 and 3, the push rods 70 and 72 extend through suitable clearance openings 87, 88 in the cylinder heads which are located as close as possible to the cylinder bore 10 and are on opposite sides of the intake valve passage 30.

Covering the valve operating mechanism of Figures 2 and 3 is a dished cover 37 which may be secured by bolts 89 threaded into the bearing blocks 77 as at 90, this cover 37 being sealed against the top face 91 of the cylinder head by a resilient gasket 92 acting between a peripheral flange 93 of the cover 37 and the top face 91 of the cylinder head.

Alternatively (see Figure 1) the cover 37 may be held in place by acorn nuts 92 acting against shouldered collars 93 slipped over studs 94 rigidly carried by the bearing blocks 77 to which they are locked by nuts 95.

As seen in Figure 2, the exhaust side of the rocker mechanism cover 37 has its flange portion 93a and side wall portion 96 provided with alternate bulges 97 and valleys 98 (only one of each being shown) to provide in effect a scalloped edge. The cylinder heads 12 and 12a are recessed adjacent the valleys by angularly inclined cylindrical bores 45 which extend inwardly of the cylinder heads in the direction of the central region of the combustion chambers 13 and terminate in cylindrical threaded apertures 102 in which the sparking elements 39 are mounted and through which they extend into the recesses 23b of the combustion chambers. As evident from Figures 1, 2 and 3, it will be observed that the axes of the bores 45 and elements 39 are inclined to a vertical longitudinal plane and to a transverse vertical plane. The same inclination is evident in Figures 7, 8 and 10. In the exemplified structure described above having a 3½" bore, the axis of the sparking element 39 was arranged at an angle of about 18° to the vertical longitudinal plane through the cylinder axis 33 measured in the plane of Figures 3, 8, and at an angle of about 24° to the transverse vertical plane measured in the plane of Figures 2 and 7 and extended from a point of origin distant 9/16" from the vertical longitudinal plane 45/64" from the transverse vertical plane and 13/64" above the mounting face 22A.

It will be observed that by reason of the compact construction and arrangement of the valve mechanism, it is possible to make the spark elements 39 not only accessible from the exhaust side of the engine and independently of the rocker arm cover 37, but that no special tools will be required for removing and replacing the sparking elements and that they are advantageously exposed in the combustion chamber 13 at a position intermediate the intake and exhaust valves and generally centrally of the chamber.

In Figures 8 to 12 the construction is of somewhat simplified form, the combustion chamber 13 in these figures being of modified spherical form adapted for casting to its finished dimensions and shape. Here the intake valve 25 operates directly against a seat 110 formed on a flat cast face 112 which is normal to the intake valve axis 29 and comprised in the outward polygonal depression generally designated by the numeral 24, of the spherical surface 21 basically defining the combustion chamber while the exhaust valve operates directly against a seat 116 formed in a flat cast face 118 also comprised in the polygonal depression 24 and which face 118 is in a plane generally normal to the axis 32 of the exhaust valve 26 and slightly above and paralleling a tangential plane to the dome of the basic spherical surface. Intermediate the intake and exhaust valve ports 25a and 26a and between the cast faces 112, 118 mounting the valves 25, 26 are flat triangular cast surfaces 120, 122 providing a stepped relation with the faces 112, 118, as seen for example in Figures 11 and 12, and the apexes of which triangular surfaces meet approximately on a line connecting the centers of the valve ports. The triangular face 120 moreover terminates at its outer end in the spherical surface 21 while the triangular face or land 122 terminates at its end adjacent the spherical surface 21 in a conical depression 124, best seen in Figure 10, through which the firing elements 40, 41 of the spark element or plug 39 may project.

The stems 52, 54 of the intake and exhaust valves of Figure 8 are slidably journalled directly in suitable bores provided in the cylinder heads 12 and 12a thus omitting the bushings of the Figure 3 construction. Fixed to the upper ends 60, 62 of the valve stems in this figure are split collars 126 beneath which are single compression springs 128 serving to normally maintain these valves in closed position. The valves in Figure 6 are operated as those of Figure 3 by the camshaft 36 of Figure 1 through suitable tappet and push rod arrangements. Thus conventional tappets 67 may be associated with the camshaft 36 and are slidably journalled in the lateral bearing portions 68 integral with the cylinder block 11. These tappets are operably connected through suitable push rods 130, 132 with the relatively short lever arms 134, 136 respectively of inlet valve and exhaust valve rocker arms 74a, 75a respectively, which are journalled on a common hollow rocker shaft 138 carried in mounting blocks 140 secured by bolts 142 to the top face of the cylinder heads 12 and 12a.

It will be noted that the push rods 130, 132 have ball-ended tips 144 which are received in spherical sockets 146 of the short lever portions 134, 136 of the rocker arms while the long lever portions 148, 150 of these rocker arms abut against the ends of the shanks 52, 54 respectively of the valves. As in the case of the Figure 3 arrangement, our novel structure and valve arrangement facilitates the use of rocker arms for both intake and exhaust valves, the ratios of whose short to long lever arms the same, thus making possible equal wear on the cam faces 83 of the camshaft 36. Moreover, by preference, the corresponding short levers 134, 136 respectively, of the intake and exhaust rocker arms will be of the same length and the same will be true of the corresponding long levers 148, 150.

As seen in Figures 1, 8, and 10, the valve operating mechanism of Figure 8 is covered by a narrow dished cover 38 having a downwardly edge bent flange 152 seated on a raised ledge 154 of the heads 12 and 12a. The portion 152a of the flange at the exhaust side of the engine is scalloped as seen in Figure 7 and the portion 154 of the ledge upon which it seats is similarly contoured. The flange portion opposite the portion 152a as well as the end flanges are substantially straight and seat on straight portions of the cylinder head projection 154. The cover 38 is mounted on the cylinder heads through an intervening resilient gasket 160 which is confined between side wall portions 162, 163 of the cover flanges. It will be noted from Figures 7 and 8 that certain of the rocker shaft bearings 164 mounting bolts 165, to wit, the mounting bolts 94 as in Figures 1 and 8 are in the form of studs described above provided with upward stud extensions which project through openings 166 in the cover 38 and over which are received shouldered collars 93 and acorn-shaped nuts 92 for securing the cover in place, the collars having their reduced portions received in the openings 166.

It will be noted from Figures 8 and 10 that in the region between the outward bulges 176 of the scalloped portions of the cover flange 152a and cylinder head ledge 154a, the cylinder head casting drops to a lower level 180 where it provides a cylindrical stepped bore 182 for receiving the spark element 39, this bore 182 opening into the conical depression 124 of the combustion chamber and its lowest step 184 being threaded to mount the spark element 39. It will be evident that the sparking element 39 in Figures 8 and 10 is more readily accessible than that in the Figure 3 construction. As in Figure 3, the sparking element 39 is here also spaced from the valve operating mechanism and cover and its sparking points 40, 41 project into the combustion chamber at a position intermediate the intake and exhaust valves and generally centrally of the chamber.

A further feature of our invention is the mode of carrying oil to the upper push rod tips and to the intake valves. Thus oil under suitable pressure is carried to the hollow rocker shaft 138, which may be suitably plugged at its opposite ends. The oil is conducted here through holes (not shown) in the camshaft journal and drilled passages (not shown) in the block and cylinder heads to holes 180 in the rocker shaft bracket studs 94. Holes 182, 184 through the walls of the hollow rocker shafts 138 meter oil to passages 186, 188 in the rocker arms connecting through their bores with the holes 182, 184 respectively, and thus oil is conducted by gravity via passages 190, 192 to the push rod sockets 144 for lubricating the push rod tips. The passages 186, 188 index periodically with the holes 182, 184 of the rocker shaft to receive fresh oil. The intake valve stems are lubricated through a hole or passage 194 in the intake valve rocker arm 74a which does not register with a hole in the rocker shaft 138 but which merely picks up oil seeping around the bearing. This is done as a precaution against over-oiling.

Although our invention has been particularly illustrated as applied to specific V engine applications, it will be understood that the principles and features disclosed may be applied by those skilled in the art to other engines and that various changes, modifications and substitutions may be made without departing from the spirit and intent of our invention.

We claim:

1. An internal combustion engine comprising a cylinder block, a plurality of cylinder bores arranged therein longitudinally of the engine with their axes in a common plane, a cylinder head on said block having a mounting surface in assembled relation to said block, a combustion chamber over each cylinder bore, a single inlet valve and a single exhaust valve disposed in each chamber, the axis of said inlet valve being on one side of said common plane and lying in a transverse plane which is normal to said common plane, and on one side of and in juxtaposition to a second transverse plane normal to said common plane and through the vertical axis of its cylinder bore, and said inlet valve axis being inclined to said common plane at an acute angle and intersecting said plane at a point below said mounting surface and the axis of said exhaust valve substantially paralleling said cylinder bore axis and being offset from said common plane and said second transverse plane and on opposite sides of each of these planes from said inlet valve axis, an operating lever arm for said inlet valve having its axis of oscillation extending longitudinally of the engine and located above and intermediate said valves and on the inlet valve side of said common plane, an operating lever arm for said exhaust valve having its axis of oscillation substantially coaxial with that of said inlet valve operating arm, each of said operating arms having opposite lever portions one of greater length than the other, crankshaft means carried by said block, valve operating cam means carried by said block and extending longitudinally of said engine above said crankshaft means and to one side of said cylinder head, push rod means operably connecting said cam means with the shorter of said levers of each valve operating arm and stem means on each valve operably connecting with the longer of said levers of its operating arm.

2. An internal combustion engine comprising a cylinder block, a plurality of cylinder bores arranged therein longitudinally of the engine with their axes in a common plane, a cylinder head on said block having a mounting surface in assembled relation to said block, a combustion chamber over each cylinder bore, a single inlet valve and a single exhaust valve disposed in each chamber, the axis of said inlet valve being on one side of said common plane and lying in a transverse plane which is normal to said common plane and on one side of and in juxtaposition to a second transverse plane normal to said common plane and through the vertical axis of its cylinder bore, and said inlet valve axis being inclined to said common plane at an acute angle and intersecting said common plane at a point below said mounting surface and the axis of said exhaust valve substantially paralleling said cylinder bore axis and being offset from said common plane and said second transverse plane and on opposite sides of each of these planes from said inlet valve axis, an operating lever arm for said inlet valve having its axis of oscillation extending longitudinally of the engine and located above and intermediate said valves and on the inlet valve side of said common plane, an operating lever arm for said exhaust valve having its axis of oscillation substantially coaxial with that of said inlet valve operating arm, each of said operating arms having opposite lever portions one of greater length than the other, crankshaft means carried by said block, valve operating cam means carried by said block and extending longitudinally of said engine above said crankshaft means and to one side of said cylinder head, push rod means operably connecting said cam means with the shorter of said levers of each valve operating arm and stem means on each valve operably connecting with the longer of said levers of its operating arm, the ratio of the longer to the shorter of the levers of each said valve operating arms being substantially the same.

3. An internal combustion engine comprising a cylinder block, a plurality of cylinder bores arranged therein longitudinally of the engine with their axes in a common plane, a cylinder head on said block having a mounting surface in assembled relation to said block, a combustion chamber over each cylinder bore, a single inlet valve and a single exhaust valve disposed in each chamber, the axis of said inlet valve being on one side of said common plane and lying in a transverse plane which is normal to said common plane, and on one side of and in juxtaposition to a second transverse plane normal to said common plane and through the vertical axis of its cylinder bore, and said inlet valve axis being inclined to said common plane at an acute angle and intersecting said common plane at a point below said mounting surface and the axis of said exhaust valve substantially paralleling said cylinder bore axis and being offset from said common plane and said second transverse plane and on opposite sides of each of these planes from said inlet valve axis, an operating lever arm for said inlet valve having its axis of oscillation extending longitudinally of the engine and located above and intermediate said valves and on the inlet valve side of said common plane, an operating lever arm for said exhaust valve having its axis of oscillation substantially coaxial with that of said inlet valve operating arm, each of said operating arms having opposite lever portions one of greater length than the other, crankshaft means carried by said block, valve operating cam means carried by said block and extending longitudinally of said engine above said crankshaft means and to one side of said cylinder head, push rod means operably connecting said cam means with the shorter of said levers of each valve operating arm and stem means on each valve operably connecting with the longer of said levers of its operating arm, all of the levers of said valve operating arms operable by said push rods being of substantially the same length and all of the levers of said valve operating arms acting on said valve stems being of substantially the same length.

4. An internal combustion engine comprising a cylinder block, a plurality of cylinder bores arranged therein longitudinally of the engine with their axes in a common plane, a cylinder head on said block having a mounting surface in assembled relation to said block, a combustion chamber over each cylinder bore, a single inlet valve and a single exhaust valve disposed in each chamber, the axis of said inlet valve being on one side of said common plane and lying in a transverse plane which is normal to said common plane, and on one side of and in juxtaposition to a second transverse plane normal to said common plane and through the vertical axis of its cylinder bore, and said inlet valve axis being inclined to said common plane at an acute angle and intersecting said common plane at a point below said mounting surface and the axis of said exhaust valve substantially paralleling said cylinder bore axis and being offset from said common plane and said second transverse plane and on opposite sides of each of these planes from said inlet valve axis, an operating lever rocker arm for each of said inlet valves and an operating lever rocker arm for each of said exhaust valves, all carried by a single rocker arm shaft extending longitudinally of the engine, and above and intermediate said valves and on the inlet valve side of said common plane, each of said rocker arms having opposite lever portions one of which is operable to act on a valve, crankshaft means carried by said block and extending longitudinally of the engine, valve operating cam means carried by said block and extending longitudinally of said engine above said crankshaft means and push rod means operably connecting said cam means with the lever arms of said rocker arms opposite those acting on said valves.

5. An internal combustion engine comprising a cylinder block, a plurality of cylinder bores arranged therein longitudinally of the engine with their axes in a common plane, a cylinder head on said block having a mounting surface in assembled relation to said block, a combustion chamber over each cylinder bore, a single inlet valve and a single exhaust valve disposed in each chamber, the axis of said inlet valve being on one side of said common plane and lying in a transverse plane which is normal to said common plane, and on one side of and in juxtaposition to a second transverse plane normal to said common plane and through the vertical axis of its cylinder bore, and said inlet valve axis being inclined to said common plane at an acute angle and intersecting said common plane at a point below said mounting surface, and the axis of said exhaust valve substantially paralleling said cylinder bore axis and being offset from said common plane and said second transverse plane and being on the opposite side of each of these planes from said inlet valve axis, a sparking element extending into each chamber from the top side of said head on the exhaust valve side thereof, the axis thereof being inclined to said common plane and to said second transverse plane and intersecting said common plane at a point below said mounting surface but above the point where the axes of the inlet valves intersect this plane, an operating lever arm for said inlet valve having its axis of oscillation extending longitudinally of the engine and located above and intermediate said valves and on the inlet valve side of said common plane, an operating lever arm for said exhaust valve having its axis of oscillation substantially coaxial with that of said inlet valve operating arm, each of said operating arms having opposite lever portions one of greater length than the other, crankshaft means carried by said block, valve operating cam means carried by said block and extending longitudinally of said engine above said crankshaft means, push rod means operably connecting said cam means with the shorter of said levers of each valve operating arm and stem means on each valve operably connecting with the longer of said levers of its operating arm, a dished rocker cover seated on said cylinder head top side and extending longitudinally of the engine to cover the valve operating mechanism, the side of said cover adjacent the exhaust valves having an undulated shape comprising outwardly extending portions extending around the exhaust valve mechanism to cover the same and valleys intermediate the outwardly extending portions for skirting said sparking elements so as to render them visibly accessible exteriorly of said cover.

6. An internal combustion engine comprising a cylinder block, a plurality of cylinder bores arranged therein longitudinally of the engine with their axes in a common plane, a cylinder head on said block having a mounting surface in assembled relation to said block, a combustion chamber over each cylinder bore, a single inlet valve and a single exhaust valve disposed in each chamber, the axis of said inlet valve being on one side of said common plane and lying in a transverse plane which is normal to said common plane, and on one side of and in juxtaposition to a second transverse plane normal to said common plane and through the vertical axis of its cylinder bore, and said inlet valve axis being inclined to said common plane at an acute angle and intersecting said common plane at a point below said mounting surface and the axis of said exhaust valve substantially paralleling said cylinder bore axis and being offset from said common plane and said second transverse plane and being on the opposite side of each of these planes from said inlet valve axis, the top side of said head on said exhaust valve side thereof being stepped and the inner side of said step defining a vertical wall of scalloped shape whose outward portions extend around the exhaust valves and whose valleys occur between each pair of adjacent exhaust valves, a sparking element extending inwardly from the base of said step at the valley adjacent each exhaust valve and opening into the combustion chamber at a position intermediate said valves, the axis of said element being inclined to said common plane and to said second transverse plane, an operating lever arm for said inlet valve having its axis of oscillation extending longitudinally of the engine and located above and intermediate said valves and on the inlet valve side of said common plane, an operating lever arm for said exhaust valve having its axis of oscillation coaxial with that of said inlet valve operating arm, each of said operating arms having opposite lever portions one of greater length than the other, crankshaft means carried by said block, valve operating cam means carried by said block and extending longitudinally of said engine above said crankshaft means, push rod means operably connecting said cam means with the shorter of said levers of each valve operating arm and stem means on each valve operable connecting with the longer of said levers of its operating arm, and a dished rocker arm cover seated on the top side of said cylinder head and having its exhaust valve side provided with a scallop conforming substantially to that of the inner side of said cylinder head step.

7. In an internal combustion engine of the V type having a block provided with opposite cylinder banks each having a plurality of cylinder bores longitudinally spaced therein, and a head on each bank having a plurality of combustion chambers, one for each cylinder bore and superimposed thereon, an intake and exhaust system for said combustion chambers of each bank comprising an intake and an exhaust port in each said chamber on opposite sides of a longitudinal plane containing the axis of the cylinder bores of its bank, said ports in each said chamber also being on opposite sides of a transverse plane through the axis of the cylinder bore of their chamber and normal to said first mentioned plane, an intake and an exhaust valve for each said chamber reciprocably mounted in said heads, said valves being operable to open and close said ports therein, a single rocker shaft mounted on each said head in a plane extending generally parallel to said longitudinal plane, an intake and an exhaust rocker arm for said valves of each chamber pivotally mounted on said rocker shafts, each of said rocker arms having opposite lever portions, one of said lever portions of said exhaust valve rocker arms abutting the stems of said exhaust valves on one side of their rocker shaft and one of said lever portions of said intake rocker arms abutting the stems of said intake valves on the other side of said rocker shaft, a push rod for each of said rocker arms and arranged to abut the other lever portions of said rocker arms, the push rod for each said exhaust valve rocker arm abutting said other lever portion thereof on one side of its rocker shaft and the push rod for each said intake valve rocker arm abutting said other lever portion on the opposite side of its rocker shaft, a camshaft rotatably mounted intermediate said banks in said block and extending generally parallel to said longitudinal plane, and said push rods being arranged and constructed as to operably connect said camshaft at one end and the rocker arms to be operated thereby at its other end.

8. In an internal combustion engine having a block provided with a cylinder bank having a plurality of cylinder bores longitudinally spaced therein, a head on said bank having a plurality of combustion chambers, one for each cylinder bore and superimposed thereon, an intake and exhaust system for said combustion chambers of said bank comprising an intake and an exhaust port in said chamber on opposite sides of a longitudinal plane containing the axis of the cylinder bores of said bank, said ports also being on opposite sides of a transverse plane through the axis of the cylinder bore of its chamber and normal to said first mentioned plane, an intake and an exhaust valve for each said chamber reciprocably mounted in said head, said valves being operable to open and close said ports, a single rocker shaft mounted on said head in a plane extending generally parallel to said longitudinal plane, a rocker arm for each of said valves of each chamber pivotally mounted on said shaft, each of said rocker arms having opposite lever portions, one of said lever portions for the exhaust valve rocker arm abutting the stem of said exhaust valve on one side of said rocker shaft and one of said lever portions of the intake rocker arm abutting the stem of the intake valve on the other side of said rocker shaft, a push rod for each of said rocker arms and arranged to abut the other lever portion of said rocker arms, the push rod for said exhaust valve rocker arm abutting said other lever portion thereof on one side of said rocker shaft and the push rod for said intake valve rocker arm abutting its said other lever portion on the opposite side of said rocker shaft, a camshaft rotatably mounted in said block and extending generally parallel to said longitudinal plane and said push rods being arranged and constructed as to operably connect said camshaft at one end and its rocker arm to be operated thereby at its other end.

9. In an internal combustion engine having a block with a plurality of cylinder bores longitudinally spaced therein with their axes in a common first plane, a mounting surface adjacent said cylinder bores, a head mounted on said mounting surface, said head having an equal plurality of combustion chambers therein superimposed on said cylinder bores, an improved intake and exhaust system for said combustion chambers comprising an intake and an exhaust port in each said chamber on opposite sides thereof, the axis of each said exhaust port and the axis of each said cylinder bore being in a second plane offset from said first plane approximately 45°, the plane through the axis of each said intake port and the axis of each said cylinder being offset from said first plane approximately 82° and from said second plane approximatley 37°, a pair of intake and exhaust valves for each said chamber reciprocably mounted in said head, the axis of said intake valve being on one side of said common plane and lying in a transverse plane which is normal to said common plane, and on one side of and in juxtaposition to a second transverse plane normal to said common plane and through the vertical axis of its cylinder bore, and said intake valve axis being inclined to said common plane at an acute angle and intersecting said plane at a point below said mounting surface and the axis of said exhaust valve substantially paralleling said cylinder bore axis and being offset from said common plane and said second transverse plane and on opposite sides of each of these planes from said intake valve axis, said valves being operable to open and close said ports, a single rocker shaft mounted on said head parallel to the longitudinal axis thereof, a pair of rocker arms for each said pair of valves pivotally mounted on said rocker arm, one of said arms of each said pair abutting the stem of one of said valves of each said pair on one side of said rocker shaft, the other of said arms of each said pair abutting the stem of the other of said valves of each said pair on the other side of said rocker shaft, a pair of push rods for each said pair of rocker arms, one of said push rods of each said pair abutting one of said arms of each said pair on one side of said rocker shaft, the other of said push rods of each said pair abutting the other of said arms of each said pair on the other side of said rocker shaft, a camshaft rotatably mounted in said block parallel to the longitudinal axis of said head, said push rods contacting said camshaft and operative in response to rotation thereof to move said rocker arms and said valves to regulate the fluid flow through said ports.

10. In an internal combustion engine having a block with a plurality of cylinder bores longitudinally spaced therein with their axes in a common plane, a mounting surface adjacent said cylinder bores, a head mounted on said mounting surface, said head having an equal plurality of combustion chambers therein superimposed on said cylinder bores, an improved intake and exhaust system for said combustion chambers comprising an intake and an exhaust port in each said chamber on opposite sides thereof and offset from said common plane, a pair of intake and exhaust valves for each said chamber reciprocably mounted in said head, the axis of said intake valve being on one side of said common plane and lying in a transverse plane which is normal to said common plane, and on one side of and in juxtaposition to a second transverse plane normal to said common plane and through the vertical axis of its cylinder bore, and said intake valve axis being inclined to said common plane at an acute angle and intersecting said plane at a point below said mounting surface and the axis of said exhaust valve substantially paralleling said cylinder bore axis and being offset from said common plane and said second transverse plane and on opposite sides of each of these planes from said intake valve axis, said valves being operable to open and close said ports, a single rocker shaft mounted on said head parallel to the longitudinal axis thereof, a pair of rocker arms for each said pair of valves pivotally mounted on said rocker arm, one of said arms of each said pair abutting the stem of one of said valves of each said pair on one side of said rocker shaft, the other of said arms of each said pair abutting the stem of the other of said valves of each said pair on the other side of said rocker shaft, a pair of push rods for each said pair of rocker arms, one of said push rods of each said pair abutting one of said arms of each said pair on one side of said rocker shaft, the other of said push rods of each said pair abutting the other of said arms of each said pair on the other side of said rocker shaft, a camshaft rotatably mounted in said block parallel to the longitudinal axis of said head, said push rods contacting said camshaft and operative in response to rotation thereof to move said rocker arms and said valves to regulate the fluid flow through said ports, all of said rocker arms being substantially the same length, and all of said push rods being substantially the same length.

11. In an internal V type combustion engine, a cylinder block, opposed cylinder banks thereon, a plurality of cylinder bores in each said bank longitudinally spaced along a common plane, a camshaft rotatably mounted in said block parallel to said common plane, a head mounted on each said bank, each said head having an equal plurality of combustion chambers coinciding with said cylinder bores of each said bank, an intake and an exhaust valve in each combustion chamber offset on opposite sides of said common plane, a rocker shaft mounted on each said head parallel to said common plane thereof and lying in a plane intermediate the stems of said intake and said exhaust valves, a plurality of intake valve rocker arms and exhaust valve rocker arms pivotally mounted on each said rocker shaft, said intake valve rocker arms having first portions on one side of their rocker shaft abutting the stems of their intake valves, said exhaust valve rocker arms having first portions on the other side of their rocker shaft abutting the stems of their exhaust valves, and a plurality of push rods abutting said camshaft and a second portion of each said rocker arm lying on the side of their rocker shaft opposite to said first portion of each said rocker arm.

References Cited in the file of this patent

UNITED STATES PATENTS

| | | |
|---|---|---|
| 1,306,949 | Coatalen | June 17, 1919 |
| 1,403,350 | Short | Jan. 10, 1922 |
| 1,488,285 | Rhoads | Mar. 25, 1924 |
| 1,698,995 | Harrington | Jan. 15, 1929 |
| 2,126,939 | Winfield | Aug. 16, 1938 |
| 2,523,611 | Clayton | Sept. 26, 1950 |
| 2,669,227 | Drinkard | Feb. 16, 1954 |
| 2,700,969 | Nallinger | Feb. 1, 1955 |
| 2,765,781 | Turlay | Oct. 9, 1956 |

FOREIGN PATENTS

| | | |
|---|---|---|
| 635,240 | Great Britain | Apr. 5, 1950 |
| 968,120 | France | Apr. 12, 1950 |
| 276,820 | Switzerland | Nov. 1, 1951 |

UNITED STATES PATENT OFFICE

CERTIFICATION OF CORRECTION

Patent No. 2,957,461            October 25, 1960

Melbourne L. Carpentier et al.

It is hereby certified that error appears in the above numbered patent requiring correction and that the said Letters Patent should read as corrected below.

Column 12, line 14, for "operable" read -- operably --; line 65, after "in" insert -- each --.

Signed and sealed this 2nd day of May 1961.

(SEAL)
Attest:

ERNEST W. SWIDER
Attesting Officer

DAVID L. LADD
Commissioner of Patents